United States Patent [19]
Yoshimura et al.

[11] Patent Number: 6,080,466
[45] Date of Patent: Jun. 27, 2000

[54] COMPOSITE SHEETS FOR WIPING CLOTHS

[75] Inventors: Jiro Yoshimura; Akira Sakamoto, both of Tokyo; Hirotoshi Aikawa, Hokkaido; Yoichi Yamazaki, Tokyo, all of Japan

[73] Assignee: Nippon Paper Industries, Co., Ltd., Tokyo, Japan

[21] Appl. No.: 08/968,117

[22] Filed: Nov. 12, 1997

[30]     Foreign Application Priority Data

Nov. 14, 1996  [JP]  Japan .................................. 8-302787

[51] Int. Cl.⁷ ................................ B32B 5/16; B32B 3/28
[52] U.S. Cl. .......................... 428/152; 428/153; 428/154; 428/219; 428/220; 428/338; 428/340; 442/334; 442/385; 442/387; 442/408; 442/412; 442/413
[58] Field of Search ..................... 428/152, 153, 428/154, 219, 220, 338, 340; 442/334, 385, 387, 408, 412, 413

[56]            References Cited

U.S. PATENT DOCUMENTS

| | | |
|---|---|---|
| 1,301,605 | 4/1919 | Ringel ..................................... 428/154 |
| 2,014,460 | 9/1935 | Rim ......................................... 428/154 |
| 2,069,778 | 2/1937 | Rowe ...................................... 428/154 |
| 3,775,231 | 11/1973 | Thomas .................................. 428/154 |
| 5,219,633 | 6/1993 | Sabee ..................................... 428/154 |
| 5,284,703 | 2/1994 | Everhart et al. ....................... 428/283 |
| 5,389,202 | 2/1995 | Everhart et al. ....................... 162/103 |

FOREIGN PATENT DOCUMENTS

| | | |
|---|---|---|
| 5179545 | 7/1993 | Japan . |
| 05214654 | 8/1993 | Japan . |
| 5214654 | 8/1993 | Japan . |

*Primary Examiner*—William P. Watkins, III
*Attorney, Agent, or Firm*—Stevens, Davis, Miller & Mosher, L.L.P.

[57]           ABSTRACT

The present invention overcomes drawbacks of prior composite sheets consisting of a spun-bonded nonwoven fabric and pulp fibers and provides an inexpensive composite sheet with excellent draping qualities, a nearly fabric-like touch and good usability. According to the present invention, a composite sheet made by entangling a web of thermoplastic filaments with pulp fibers under water stream is creped to increase the elongation in machine direction as high as in cross direction enough to obtain a usability equal to those of fabric wipers.

6 Claims, No Drawings

COMPOSITE SHEETS FOR WIPING CLOTHS

FIELD OF THE INVENTION

The present invention relates to composite sheets which can be suitably used as industrial wipers, rag, counter cloths, dishcloths, dustcloths, etc. The contents of Application No. 8-302787 filed Nov. 14, 1996 in Japan are hereby incorporated by reference.

BACKGROUND OF THE INVENTION

Composite sheets made by entangling continuous filaments with pulp fibers under a water stream have been known from, for example, JPA No. 179545/93 entitled "Nonwoven composite fabric with a high pulp content" and JPA No. 214654/93 entitled "A process for producing wiping cloth". These inventions represent advanced techniques in the field of wipers which overcame the disadvantageous decrease in the strength of wood pulp fiber sheets in a wet state by combining them with a continuous filament web. These techniques succeeded in conferring a high wet strength to paper wipers while maintaining excellent characteristics thereof such as water and oil absorption, low cost, etc., thus enabling them to be used like fabric wipers.

However, these techniques can be actually put into practice only by using spun-bonded nonwoven fabrics with a low density per unit area (20 g/m$^2$ or less) as the continuous filament web due to problems of costs, strength, etc. Spun-bonded nonwoven fabrics with a low density per unit area have a biased fiber orientation mostly toward machine direction. As a result, a great difference arises in tensile strength and elongation between machine and cross direction simply by combining a spun-bonded nonwoven fabric with pulp fibers by entanglement under a water stream.

Commercially available wiping cloths made from a complex of a spun-bonded nonwoven fabric and pulp fibers also involve anisotropy between machine and cross directions as shown in Table 1. This table reports the measurements of breaking loads and elongations at breakage in tensile tests in machine and cross directions. The machine direction here means a direction which is parallel to lines formed by entanglement under a water stream in the direction of the stream. The results of measurement in both commercial products show that breaking loads are twice or more in the machine direction than in the cross direction and elongations are 1.9 times or more in the cross direction than machine direction. These anisotropies do not affect basic performances for wipers such as water/oil absorption, wiping properties, etc., but greatly affect usability during a wiping operation. These products are characterized by their high strength equal to fabric wipers as compared with paper wipers.

However, an anisotropy between machine and cross directions of a sheet, particularly a difference in elongation, provide an unpleasant texture as compared with fabric wipers. For example, a wiper made from a low-elongation material should be used with care of orientation because it is readily broken by a metal projection on the object to be wiped.

The above-mentioned commercial products (Table 1) are poor in draping qualities (suppleness, softness) and rather inferior to fabric wipers in touch. Water-stream entangled nonwoven fabrics using staple fibers such as synthetic fibers (such as polyester fibers, polypropylene fibers, nylon fibers, acrylic fibers, etc.), rayon, cotton, etc. have nearly fabric-like draping qualities. These fibers have the advantage that they are bonded more weakly than pulp fibers so that the resulting sheet is not so stiff as paper, but are not a realistic alternative to a fabric wiper due to high costs.

SUMMARY OF THE INVENTION

The present invention was made with the object of improving the drawbacks of such prior composite sheets consisting of a spun-bonded nonwoven fabric and pulp fibers and providing a composite sheet with excellent draping qualities, a nearly fabric-like touch and a good usability at low cost.

As a result of study of the above drawbacks, the inventors found that a fabric-like usability can be obtained by creping a composite sheet made by entangling a web of thermoplastic filaments with pulp fibers under water stream to increase the elongation in machine direction as high as in cross direction, and thus accomplished the present invention.

Creping is a treatment for providing crepe-like folds in a composite sheet to reduce the size in machine direction, thus increasing the elongation in machine direction. Pulp fibers have many hydroxyl groups on their surface and inside thereof. Uncreped composite sheets are as stiff (with high rigidity) as paper due to mutual bonds of these hydroxyl groups. Creping not only increases the elongation in machine direction but also breaks hydrogen bonds between and within pulp fibers. Thus, creped composite sheets are no longer stiff and acquire fabric-like soft and supple properties.

Creping is a routine technique in the production of tissue paper or paper towels with the sole object of conferring softness. On the contrary, the primary object of creping in the present invention is to improve elongation. Tissue paper or paper towels are so low in wet strength that they can not be used equally to fabric wiping cloths as in the present invention using continuous filaments.

DETAILED DESCRIPTION OF THE INVENTION

The composite sheet to be creped according to the present invention comprises a web of thermoplastic continuous filaments entangled with pulp fibers under water stream, and the major material is preferably pulp fibers. Especially preferable pulp fibers forming the major material are derived from conifers, such as unbleached or bleached pulp fibers prepared by a digestion process such as kraft process, sulfite process, soda process, polysulfide process, bisulfite process, solvolysis process, etc. Unbleached or bleached pulp fibers derived from broad-leaved trees by similar digestion processes can be partially incorporated. The content of pulp derived from broad-leaved trees is preferably 50% or less based on the total pulp fiber amount because the fiber length of such pulp is shorter than that of coniferous pulp, and entanglement properties are adversely affected above this limit. Pulp fiber materials other than wood such as cotton, linseed, kenaf, jute, abaca, baggase, straw, esparto, bamboo can also be used. These can be used as an alternative to pulp from conifers and broad-leaved trees depending on the fiber length.

The continuous fiber filament web must have an appropriate void structure allowing entanglement with pulp fibers, and preferably the fineness of a continuous filament is 0.5 to 5 deniers and the basis weight of a web is 5 to 30 g/m$^2$, especially the fineness is 1 to 3 deniers and the basis weight is 10 to 20 g/m$^2$. In case of spun-bonded nonwoven fabrics made from polypropylene having a fineness of 2 deniers, for example, voids between fibers are too small at a basis weight beyond 20 g/m² while voids are too large at a basis weight below 10 g/m², and in either case, successful entanglement can not be achieved. If the fineness of filaments is increased, the proportion of voids rises to enhance the basis weight of the web, but the filaments are too rigid for creping at a fineness of more than 5 deniers. On the other hand, an appropriate void structure can be maintained at a low fineness even when the web has a low basis weight, but the filaments are not suitable at a fineness of less than 0.5 deniers because they lack their own strength or they become difficult to convert into a web. Other fibers such as rayon fibers, polyolefin fibers, polyamide fibers, polyester fibers, polyacrylic fibers may also be used for a continuous filament web.

Water stream entanglement is preferably carried out by applying a pulp fiber sheet obtained by a wet or dry process on a continuous filament web and spouting out a water column stream thereon. The pulp fiber sheet here should be formed to loosen the bonds between fibers during water stream entanglement so that fibers may be individually separated. Particularly when the pulp fiber sheet is made by a wet process, fibers are rather strongly bonded to each other. Therefore, it is not preferable to use any chemical which enhances the bonding force between fibers such as paper strength enhancer in this pulp fiber sheet. However, some chemical which weakens the bonding force between fibers (such as surfactants) may be used unless it prevents pulp fibers from being converted into a sheet, though there is no difficulty without adding any chemical. The water content in the pulp fiber sheet is not critical, but preferably as high as possible in order that fibers may readily be separated.

The basis weight of the pulp fiber sheet can be appropriately selected, depending on the performance required for wiping cloths. On the basis of the performances of wiping cloths, the pulp fiber content in a composite sheet is preferably 20 g/m² or more. Below this value, the absorption is poor for wiping cloths. However, the pulp fiber sheet may have any basis weight at which a sheet can be formed, because water stream entanglement allows a treatment of several plies of pulp fiber sheets or multiple plies of pulp fiber sheets on a composite sheet. Entanglement between pulp fibers and a continuous filament web is accomplished only when a water column stream passes through pulp fiber layers to reach the continuous filament layer and further passes through said layer. Therefore, if the basis weight of the pulp fiber sheet is higher, the water column stream does not reach the continuous filament layer to prevent entanglement.

Entanglement conditions such as water pressure, orifice diameter of the water stream nozzle, the number of nozzle orifices in width direction, the number of arrays of nozzle orifices in flow direction, line speed, etc. may be appropriately selected depending on the entanglement degree required. Entanglement conditions are not limited from the aspect of creping.

Creping may be conducted by either a wet or dry process. Wet creping with a yankee dryer, which is commonly used in the production of tissue paper or paper towels, is convenient because the treatment is simultaneous with drying. Even if a yankee dryer can not be selected, creping can be made by a dry process.

Creping conditions may be selected depending on the aspect ratio before treatment. After creping, the size of the composite sheet in machine direction is reduced, and the greater the reduced amount, the higher the elongation after treatment. This amount depends on the control of the line speed of the composite sheet. The lower the speed at which a composite sheet leaves a creping apparatus S1 than the speed at which the composite sheet enters the creping apparatus S0, the greater the reduced amount so that a high elongation is obtained. The difference in speed here is called as a compression factor of creping. The compression factor is expressed by the following equation:

$$\text{Compression factor}=(S0-S1)/S\times 100[\%].$$

This creping is preferably conducted to provide elongations of 50% or more and 100% or less as measured in tensile tests both in machine and cross directions after treatment and an aspect ratio of the elongations of 0.8% or more and 1.25 or less.

If the elongations as measured in tensile tests in machine and cross directions after creping are less than 50%, sufficient elongation can not be obtained under only a force as applied during wiping operation and the usability is not equal to that of fabric waste. An elongation of more than 100% may be obtained if the compression factor of creping is chosen at 50% or more, but this causes considerable shrinkage of raw fabric and it is extremely bad economy.

Although anisotropy between machine and cross directions develops as breaking strength, elongation or the like, what is important from the viewpoint of usability is anisotropy in elongation. In contrast to breakage which occurs only when a force equal to or higher than the breaking strength is applied, elongation occurs whenever some force is applied even it is not so strong as the breaking strength. Therefore, an anisotropy in elongation is readily perceived during a wiping operation. If the anisotropy expressed as aspect ratio is less than 0.8 (as calculated with a higher elongation as divisor) or more than 1.25 (as calculated with a lower elongation as divisor), the presence of the anisotropy is clearly perceived.

EXAMPLES

Example 1

A long fiber nonwoven fabric consisting of integrated polypropylene long fibers having many point-fused regions in which said polypropylene long fibers are self-fused to each other was prepared. The fineness of polypropylene long fibers constituting this long fiber nonwoven fabric was 2.5 deniers and the basis weight of the long fiber nonwoven fabric was 15 g/m². A paper sheet which does not contain other fiber than pulp fibers was layered on the surface of this long fiber nonwoven fabric. This paper sheet had a basis weight of 90 g/m² as measured by a method according to JIS SP 8124. This paper sheet was obtained by a wet process from coniferous bleached kraft pulp fibers with a Canadian standard freeness of 650 ml. The paper was layered on the long fiber nonwoven fabric and the layered assembly was placed on a transfer conveyor. While the layered assembly was transferred by this conveyor, it was exposed to a high-pressure water column stream spouted at a water pressure of 50 kg/cm² to penetrate the assembly from the surface of the paper sheet to the back face of the long fiber nonwoven fabric using a high-pressure water column stream spouting device with nozzle orifices of 0.1 mm in diameter spaced at 0.6 mm. A total of six arrays of nozzles were required for the treatment. After entanglement, the assembly was dried by a cylinder dryer. Thus, a nonwoven fabric sheet consisting of pulp fibers and polypropylene fibers entangled with each other was obtained.

This nonwoven fabric sheet was dry-creped by a microcreper available from Micrex Inc., US. The conditions involved a speed of 25 m/min, a temperature of 63° C., a pressing force of 60 psi, a flat blade shape and a compression factor of 20%.

Example 2

Example 1 was repeated except that the compression factor of dry creping was 15%.

Example 3

A nonwoven fabric sheet was prepared under the same conditions as in Example 1 except that the basis weight of the coniferous bleached kraft pulp was 38 g/m$^2$, the basis weight of the long fiber nonwoven fabric was 12 g/m$^2$ and the pressure of the high-pressure water column stream was 40 kg/cm$^2$.

Example 4

Example 3 was repeated except that the compression factor of dry creping was 15%.

Comparative Example 1

A sheet was prepared under the same conditions as in Example 1 without dry creping.

Comparative Example 2

A sheet was prepared under the same conditions as in Example 2 without dry creping.

[Test Method]

Each value of the following physical properties (1) to (5) reported in Tables 1 and 2 was measured under standard conditions defined by JIS P 8111 (temperature 20±2° C., humidity 65±2%). Each sample was pretreated for four hours or more according to the same standard.

(1) Basis weight
  Measured according to JIS P 8124.
(2) Thickness
  Measured according to JIS P 8118.
(3) Tensile test
  Tensile test was made under the following conditions:
Testing machine: Tensilon RT-500 type made by Orientic Inc.
Tensile speed: 50 mm/min
Width of a test piece: 30 mm
Span length: 180 mm.

(4) Clark stiffness test method
  Measured according to JIS P 8143.
(5) Water/oil absorption Ten test pieces of 5cm square were layered and fixed at four corners with staples (pin No. 10-1M made by Max Co., Ltd.). A 500 ml beaker was filled with tap water or a machine oil, and the test pieces were floated thereon to measure the period starting at the instant when the test pieces were contacted with the liquid surface until they sank in the liquid and this period was reported as water/oil absorption speed. The weight of staple pins used here was 0.986 g per 50 pins.

Then, the test pieces were removed from the liquid and allowed to stand on stainless wire of 10 meshes for one minute so that the liquid dropped off the surface, thereafter the weight (W1) was measured. This weight was divided by the weight before immersion (W0) and reported as water and/or oil absorption ratio.

Water and/or oil absorption ratio=W1/W0.

TABLE 1

| Aspect ratio of commercial products | | | |
|---|---|---|---|
| Tradename | | Workhorse | Texelwaste |
| Type | | J300 | 100-M60 |
| Source | | Jujo Kimberley | New Oji Paper |
| Basis weight, g/m$^2$ | | 96.5 | 100.7 |
| Breaking | MD, kg/3 cm | 3.2 | 3.2 |
| load | CD, kg/3 cm | 1.4 | 0.7 |
| | Aspect ratio | 2.3 | 4.7 |
| Elongati | MD, % | 26.4 | 35.2 |
| on | CD, % | 68.2 | 67.8 |
| | Aspect ratio | 0.4 | 0.5 |

TABLE 2

| | | Ex. 1 | Ex. 2 | Comp. ex. 1 | Ex. 3 | Ex. 4 | Comp. ex. 2 |
|---|---|---|---|---|---|---|---|
| Basis weight, g/m$^2$ | | 121.8 | 114.1 | 96.7 | 58.4 | 55.2 | 47.0 |
| Thickness, μm | | 416 | 413 | 409 | 218 | 208 | 189 |
| Density, g/cm$^3$ | | 0.29 | 0.28 | 0.24 | 0.27 | 0.27 | 0.25 |
| Breaking | MD, kgf/3 cm | 5.9 | 6.0 | 6.4 | 2.6 | 2.7 | 3.2 |
| load | CD, kgf/3 cm | 4.2 | 3.7 | 2.7 | 3.2 | 2.9 | 2.6 |
| | Aspect ratio | 1.4 | 1.6 | 2.4 | 0.8 | 0.9 | 1.2 |
| Elongation | MD, % | 68.2 | 58.1 | 31.6 | 65.5 | 58.3 | 30.7 |
| | CD, % | 78.6 | 70.1 | 66.7 | 70.1 | 71.1 | 75.3 |
| | Aspect ratio | 0.87 | 0.83 | 0.47 | 0.93 | 0.82 | 0.41 |
| Water absorption | second | 2.2 | 1.9 | 1.8 | 1.5 | 1.4 | 0.9 |
| speed ratio | ratio | 4.0 | 4.1 | 4.4 | 6.7 | 6.6 | 6.0 |
| Oil absorption | ' " | 5'45" | 5'32" | 5'12" | 3'09" | 2'42" | 1'56" |
| speed ratio | ratio | 3.2 | 3.5 | 4.0 | 5.1 | 5.2 | 5.0 |
| Clark stiffness | MD, cm$^3$/100 | 3.01 | 9.26 | 81.2 | 0.74 | 2.01 | 8.85 |
| | CD, cm$^3$/100 | 6.14 | 12.10 | 16.0 | 0.69 | 0.88 | 1.18 |
| Softness | | ○ | Δ | × | ◎ | ○ | × |

◎: very good, ○: good, Δ: fair, ×: bad

Examples 1 and 2 vs. Comparative example 1 show the effect of creping on a composite sheet having a basis weight of about 95 g/m$^2$. The aspect ratio of the elongations of Comparative example 1 without creping is 0.5, which is comparable to those of commercially available spun lace nonwoven fabric wipers. Example 1 in which the same sheet was creped shows a much lower anisotropy as represented by an aspect ratio of 0.9. The elongation values themselves are very high, i.e. 68.2% in MD and 78.6% in CD enough to provide good workability even during hard wiping operation. The Clark stiffness indicative of suppleness and softness was also remarkably improved, which means that the touch also approaches fabric wipers. In this example, a good softness was thus obtained without using any chemical such as softners. The water/oil absorptions indicative of wiper performances were almost unchanged before and after creping, which indicates that basic performaces were not adversely affected.

Examples 3 and 4 vs. Comparative example 2 show the effect of creping on a composite sheet having a basis weight of about 50 g/m². Good effects were again obtained. Creping is particularly effective for improving softness to provide a touch comparable to those of knitted wastes.

The softness is lowered by decreasing the compression factor to lower the degree of creping as shown in Examples 2 and 4, but no inconvenience occurs so far as a sufficient elongation is assured.

Thus, the composite sheet obtained by the present invention from a spun-bonded nonwoven fabric and pulp fibers provides excellent draping qualities, a nearly fabric-like touch and a sufficient elongation for reliable use even in hard wiping operation, while maintaining excellent characteristics such as coexistence of water/oil absorptions, high wet strength, low costs, etc.

What is claimed is:

1. A composite sheet comprising a web of thermoplastic continuous filaments entangled with pulp fibers under a water stream, wherein said sheet is creped so that the elongations as measured in tensile tests in a machine direction and cross direction after creping are in the range 50% or more and 100% or less and the aspect ratio of the elongations is between 0.8 or more and 1.25 or less.

2. A composite sheet in accordance with claim 1 wherein said pulp fibers are made from soft wood.

3. A composite sheet in accordance with claim 1 further containing pulp fibers made from hard wood.

4. A composite sheet in accordance with claim 1 wherein said continuous filament web has a fineness of 0.5 to 5 deniers and a basis weight of 5 to 30 g/m².

5. A composite sheet in accordance with claim 1 wherein said web is polypropylene.

6. A composite sheet in accordance with claim 1 wherein the content of said pulp fibers in said composite sheet is more than 20 g/m².

* * * * *